(12) United States Patent
Kim et al.

(10) Patent No.: US 7,676,300 B2
(45) Date of Patent: Mar. 9, 2010

(54) BUILDING MANAGEMENT SYSTEM AND OPERATING METHOD THEREOF INCLUDING PROTOCOL CONVERSION

(75) Inventors: Jun Tae Kim, Seoul (KR); Sang Chul Youn, Seoul (KR); Duck Gu Jeon, Seoul (KR)

(73) Assignee: LG Electronics Inc., Seoul (KR)

(*) Notice: Subject to any disclaimer, the term of this patent is extended or adjusted under 35 U.S.C. 154(b) by 69 days.

(21) Appl. No.: 11/373,108

(22) Filed: Mar. 13, 2006

(65) Prior Publication Data

US 2006/0212175 A1 Sep. 21, 2006

(30) Foreign Application Priority Data

Mar. 15, 2005 (KR) .................. 10-2005-0021462

(51) Int. Cl.
G05D 23/00 (2006.01)
(52) U.S. Cl. .................. 700/276; 700/277
(58) Field of Classification Search .......... 700/276, 700/277, 278
See application file for complete search history.

(56) References Cited

U.S. PATENT DOCUMENTS

| 2002/0120671 A1 | 8/2002 | Daffner et al. |
| 2003/0065707 A1 | 4/2003 | Gagner et al. |
| 2004/0107717 A1 | 6/2004 | Yoon et al. |
| 2004/0204793 A1 | 10/2004 | Yoon et al. |
| 2005/0097902 A1 | 5/2005 | Kwon et al. |
| 2005/0204758 A1 | 9/2005 | Kwon et al. |
| 2005/0209739 A1 | 9/2005 | Kwon et al. |

FOREIGN PATENT DOCUMENTS

| EP | 1416346 | 5/2004 |
| EP | 1429083 | 6/2004 |
| JP | 2004-349910 | 12/2004 |
| JP | 2005-037075 | 2/2005 |
| KR | 10-2003-0035399 | 5/2003 |
| KR | 10-2004-0032648 | 4/2004 |

OTHER PUBLICATIONS

Machine Translation of JP 2005-037075.*
Machine Translation of KR 10-2003-0035399.*
Machine Translation of JP 2004-349910.*
Machine Translation of KR 10-2004-0032648.*
"Neuron Chips"—http://www.echelon.com/developers/lonworks/neuron.htm.*
English Language Abstract of Korean 10-2004-0032618.
English Language Abstract of Korean 10-2003-0035399.
English Language Abstract of JP 2005-037075.
English Language Abstract of JP 2004-349910.
"A closer look on today's home and building networks," AFRICON, 2004. 7th AFRICON Conference in Africa Gaborone, Botswana Sep. 15-17, 2004, Piscataway, NJ, USA, IEEE, vol. 2, Sep. 15, 2004, pp. 1239-1245, XP010780666 ISBN: 0-7803-8605-1.

* cited by examiner

*Primary Examiner*—Ryan A Jarrett
(74) *Attorney, Agent, or Firm*—Birch, Stewart, Kolasch & Birch, LLP

(57) ABSTRACT

A building management system controller of a local operating network controls a multi-air conditioner system having a different communications network protocol. The building management system includes a controller for centrally controlling subsystems in the building including an air conditioner system, and is connected to the local operating network and a gateway that converts data between the local operating network and a network of the multi-air conditioner.

19 Claims, 7 Drawing Sheets

BUILDING MANAGEMENT SYSTEM AND OPERATING METHOD THEREOF INCLUDING PROTOCOL CONVERSION

BACKGROUND OF THE INVENTION

1. Field of the Invention

The present invention relates to a building management system and an operating method thereof, and more particularly to a building management system and an operating method thereof, wherein a multi-air conditioner system can be integrally controlled by a building management system (BMS) controller of a local operating network (e.g., LONWORKS) without modification of a network structure of the multi-air conditioner system based on an RS-485 communication scheme.

2. Description of the Related Art

Corresponding to equipment modernization of buildings in recent years, a control system has become widespread that can automatically control various subsystems installed in the building such as power/lighting and fire/security subsystems. A building management system (BMS) has been actively developed that can integrally manage these subsystems.

FIGS. 1a and 1b are block diagrams illustrating the configurations of conventional building management systems.

The conventional building management system shown in FIG. 1a includes subsystems installed in the building such as lighting, power, and security subsystems, an air conditioner system 20 including a plurality of indoor and outdoor units, and a BMS controller 10 integrally controlling all subsystems including the air conditioner system.

In general, the building management system centrally controls each subsystem through the BMS controller 10 using LONWORKS network technology based on the local operating network (e.g., LONTALK) protocol.

LONWORKS network technology, where 'Lon' stands for Local Operating Network, is a communication scheme which enables lowest level devices such as sensors and actuators, and devices for communicating and monitoring/controlling functions to send and receive data according to the same protocol. This technology supports a master/slave or peer-to-peer connection between field devices and enables a distributed control sharing information needed for control.

In the building management system, each subsystem includes at least one Lon device 15 to analyze data received from the BMS controller 10 and to send data back to the BMS controller 10.

In particular, as shown in FIG. 1a, in the air conditioner system 20 including a plurality of indoor units, the Lon device 15 can be connected to each one of the indoor units or to a group of the indoor units.

In the building management system comprising the air conditioner system 20, each indoor unit is installed in an individual room of the building, in general. Hence, it takes a long time until data sent by the BMS controller 10 for separate control of an indoor unit reaches the Lon device taking charge of the indoor unit, and is analyzed and processed. Consequently, it is difficult to immediately control the operation of the indoor unit. Moreover, because the Lon device has to be connected to each indoor unit, the installation costs of the building management system rapidly rise as the number of indoor units that are to be integrally controlled by the building management system increases.

If a Lon device is connected to a group of indoor units to reduce the installation costs, there exists a problem in that it is difficult to separately control each member of the group because all indoor units connected to the same Lon device perform the same operation according to a control command received by the Lon device.

Namely, if a Lon device is connected to a predetermined group of indoor units, all of the indoor units of the group connected to the Lon device perform the same operation. Thus, it is difficult to obtain separate control of each indoor unit. If there is a temporary need to separately control some of the indoor units, each must be separately connected to a Lon device and then controlled. After the separate control, the connected Lon device must be removed. Consequently, there exists a problem of resource waste.

Moreover, as shown in FIG. 1b, if the air conditioner system is a multi-air conditioner system in which one outdoor unit is connected with multiple indoor units, and each outdoor unit is connected to a Lon device, then the outdoor unit and indoor units perform the same operation according to a command passed through the Lon device. Hence, it is difficult to separately control the outdoor unit and indoor units.

SUMMARY OF THE INVENTION

Accordingly, the present invention has been made in view of the above problems, and it is an object of the present invention to provide a building management system and an operating method thereof that convert LONTALK protocol data into multi-air conditioner protocol data, and vice versa, so that a BMS controller of a LONWORKS network can integrally control a multi-air conditioner system without modification of the structure thereof.

It is another object of the present invention to provide a building management system and an operating method thereof that enable each air conditioner of an air conditioner system including a plurality of air conditioners to be separately controlled without a Lon communication module (Lon device) connected to each indoor unit.

In accordance with an aspect of the present invention, the above and other objects can be accomplished by the provision of a building management system comprising a BMS controller for centrally controlling subsystems, such as power and lighting subsystems, installed in the building and connected to a LONWORKS network, a multi-air conditioner system including a plurality of outdoor units and a plurality of indoor units connected to the outdoor units, and a Lon gateway for converting air conditioner system network data into LONWORKS network data, and vice versa, and enabling the BMS controller to centrally control the multi-air conditioner system.

Preferably, the Lon gateway includes a processor (e.g., NEURON) chip which translates data corresponding to the first to sixth OSI layers among control command data received through the LONWORKS network, and a microprocessor which further translates data corresponding to an application layer among the data received from the NEURON chip into RS-485 protocol data and sends it to the air conditioner system network, and translates data corresponding to an application layer among the state information data of the indoor or outdoor unit received through the air conditioner system network into data corresponding to an application layer among LONTALK protocol data and sends translated data to the NEURON chip.

In accordance with another aspect of the present invention, there is provided a method for operating a building management system (BMS) comprising the steps of: a) outputting air conditioner control command data from a BMS controller; b) converting the control command data over a LONWORKS network into multi-air conditioner protocol data; and c)

receiving the control command data at an associated air conditioner and performing an operation on the basis of the control command data.

In accordance with yet another aspect of the present invention, there is provided a method for operating a building management system (BMS) comprising the steps of: a) outputting state information data from each indoor unit or each outdoor unit; b) converting the state information data over a multi-air conditioner network into LONTALK protocol data over a LONWORKS network; and c) receiving the converted state information data via a BMS controller and outputting the state information data externally.

According to the present invention, in a building management system and an operating method thereof, a Lon gateway is provided to convert LONTALK protocol data into multi-air conditioner protocol data, and vice versa. The Lon gateway includes the NEURON chip which translates data corresponding to the first to sixth OSI layers among the data, and a microprocessor which further translates the data received from the NEURON chip and sends the translated data to a corresponding network. Consequently, the building management system can incorporate a multi-air conditioner system which utilizes a different communication technology, without modification.

Further, low-cost installation of an integrated control system in the building can be facilitated because each one of the indoor units constituting the multi-air conditioner system can be separately controlled without the need for a communication module to be connected to each indoor unit.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1A:
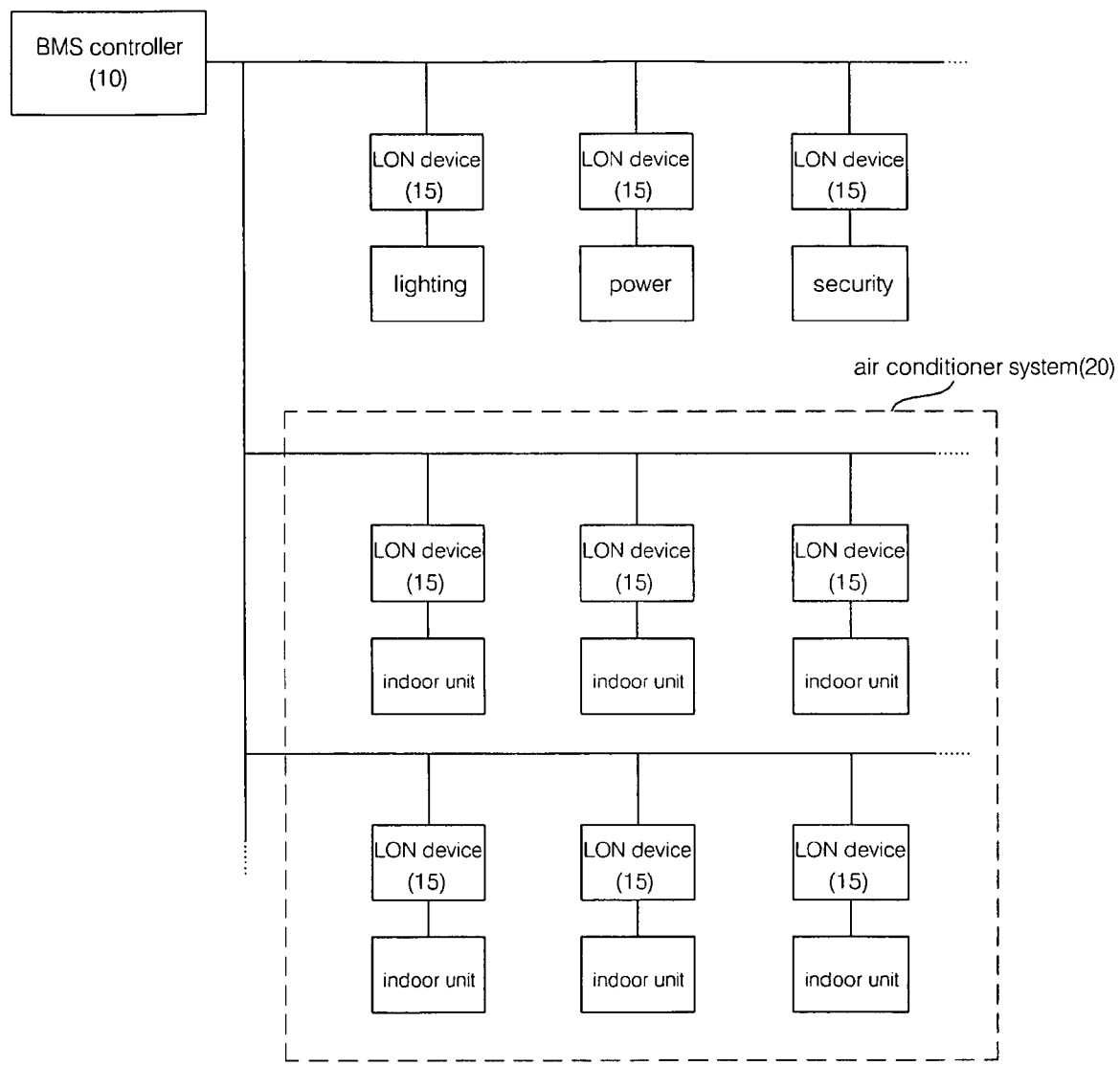
FIGS. 1a and 1b are block diagrams showing the configurations of conventional building management systems.
Figure 1B:
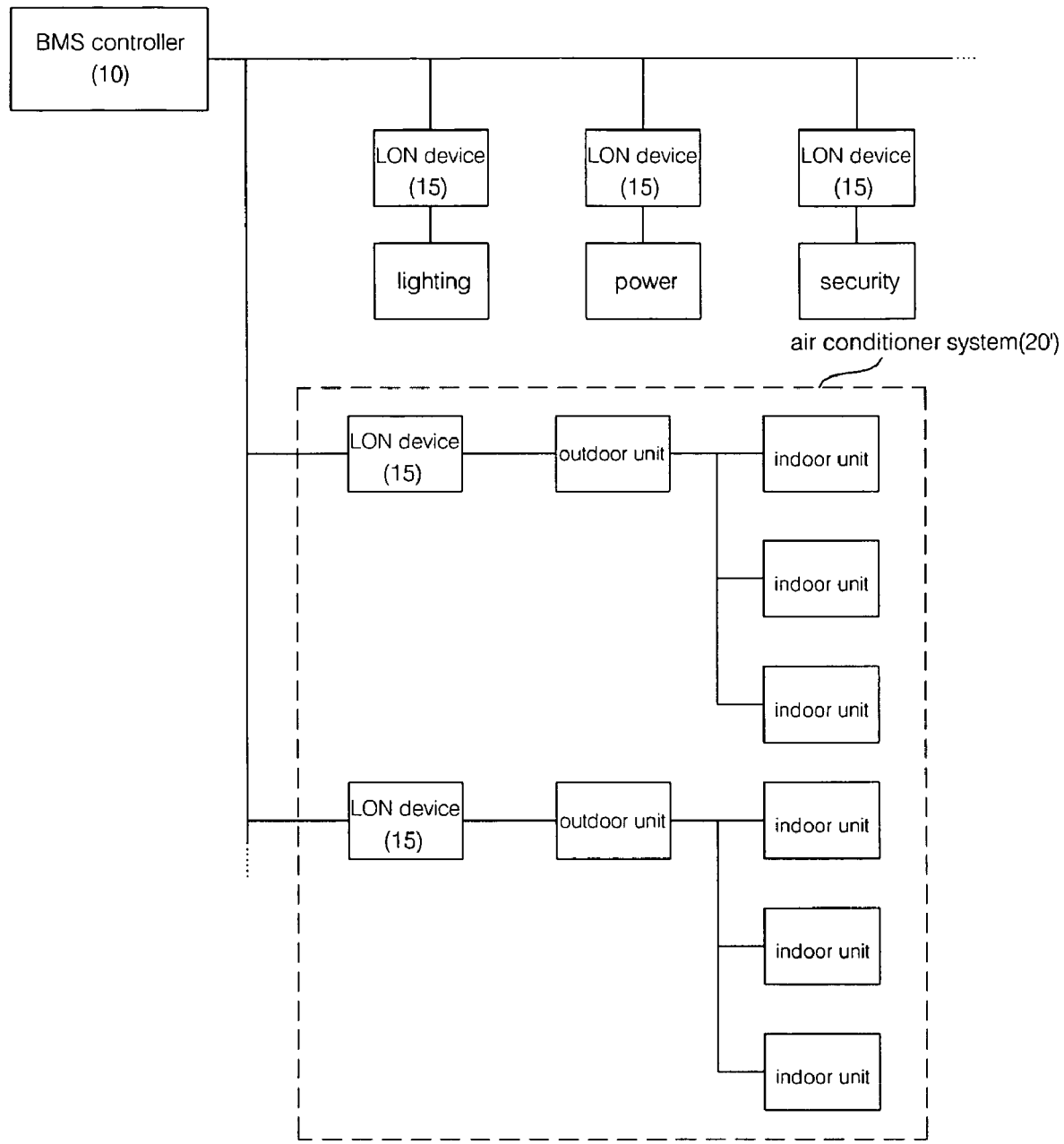
Figure 2:
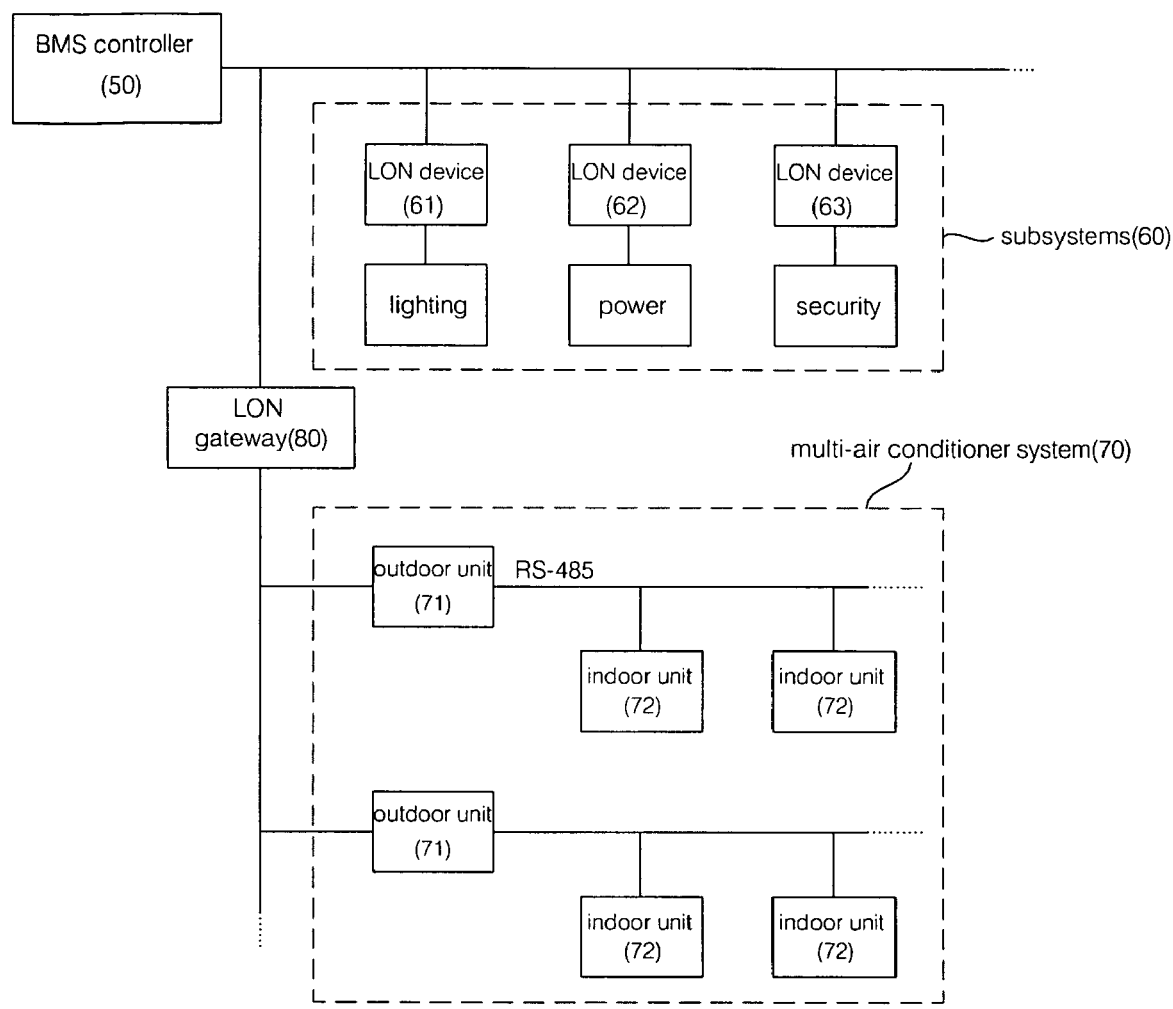
FIG. 2 is a block diagram showing the configuration of a building management system according to the present invention.

FIG. 2 is a block diagram illustrating the configuration of a building management system according to the present invention.

The building management system (BMS) according to the present invention comprises a BMS controller 50 for centrally controlling a plurality of subsystems 60 which are installed in a building and connected through a LONWORKS network, and an air conditioner system 70 which is one of the subsystems 60 and comprises an outdoor unit and an indoor unit.

The subsystems 60 can include various systems in the building, from a simple sensing system to a complex control system, such as equipment, power, lighting, crime prevention, access control, elevator, disaster prevention, and air conditioning systems. Each one of the subsystems 60 is linked with one of the Lon devices 61 to 63 and can be centrally controlled by the BMS controller 50 through the LONWORKS network.

The air conditioner system 70 may be an air-conditioner system including multiple indoor units connected to one another or a multi-air conditioner system including a plurality of multi-air conditioners, each of which includes one outdoor unit and one or more indoor units connected to the outdoor unit. In this specification, the description centers on the multi-air conditioner system as an example.

The air conditioner system 70 comprises a multi-air conditioner which includes one or more indoor units 72 placed in individual rooms and an outdoor unit 71 for controlling the flow of a coolant shared by and distributed among the indoor units 72. Multi-air conditioners are installed on floors or at predetermined spaces to perform an air conditioning function for the whole building.

In the multi-air conditioner system 70, to send and receive data, the indoor unit 72 and the outdoor unit 71 are connected through an RS-485 communication scheme which is different from that of the LONWORKS network through which the entire building management system is connected.

RS-485 is one interface standard of serial communication. In serial communication, data are sent and received on a bit-by-bit basis. Serial communication has some advantages in terms of easy implementation, long transmission distance, and low cost due to ready utilization of existing communication lines (telephone lines, for example).

This serial communication can be asynchronous or synchronous. A controller supporting the asynchronous serial communication is referred to as a universal asynchronous receiver/transmitter (UART). The output signal of the UART usually has a TTL signal level; hence it is vulnerable to noise and has a limited transmission distance. An interface integrated circuit (interface IC) which inputs this TTL level signal and outputs a signal being less vulnerable to noise and having a long transmission distance is referred to as a line driver/receiver. An RS485 interface IC is a representative line driver/receiver.

In the multi-air conditioner system 70, the indoor unit 72 and the outdoor unit 71 can also be connected through commmunication schemes other than RS-485, which are different from the LONWORKS network. Hereinafter, a communication protocol used in the multi-air conditioner network discussed above is generically referred to as a multi-air conditioner protocol.

In addition, the building management system according to the present invention further includes a Lon gateway 80 which converts multi-air conditioner network data into LONWORKS network data, and vice versa, for smooth data exchange between the multi-air conditioner system 70 and the BMS controller 50.

Figure 3:
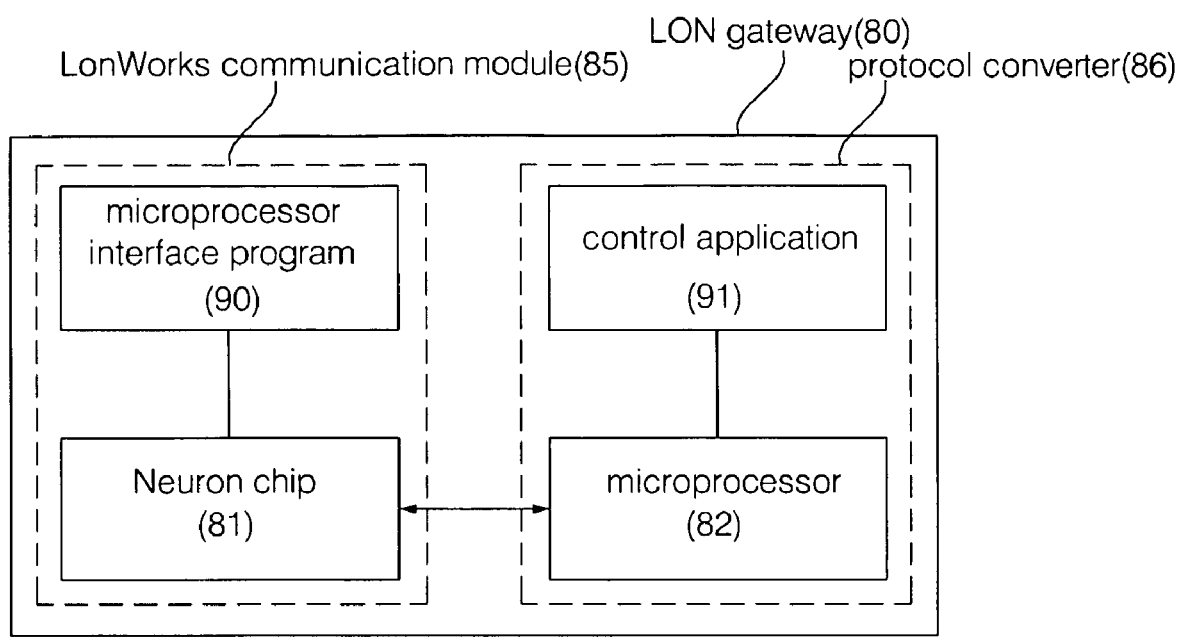
FIG. 3 is a schematic block diagram showing the configuration of a gateway according to the present invention.

FIG. 3 is a schematic block diagram illustrating the structure of the Lon gateway according to the present invention.

Before an explanation regarding the structure of the Lon gateway 80 according to the present invention, the LONWORKS network is briefly discussed as follows. The LONWORKS network is a system for distributed control of an industrial automation system, and emphasizes distributed environments, openness, and interoperability of unit devices.

The core of the LONWORKS network is the LONTALK protocol, which is a full 7-layer protocol as defined by the Open Systems Interconnection (OSI) reference model. The LONTALK protocol layers 1 to 6 are supported through a transceiver and a processor chip. Devices communicate through a transceiver supporting the layer 1 of the LONTALK protocol. The LONTALK protocol supports the following media: twisted pair (TP) cables, power lines (AC 100/220V, for example), link power (DC 24V, for example), radio frequency (RF), coaxial cables, optical fibers, and infrared.

The Lon gateway 80 includes a LONWORKS communication module 85 that analyzes data received or to be sent through the LONWORKS network according to the OSI layers, and a protocol converter 86 that converts LONTALK protocol data into multi-air conditioner protocol data, and vice versa.

The LONWORKS communication module 85 has a structure similar to that of the Lon devices 61, 62, and 63 connected to the subsystems 60 excluding the multi-air conditioner system 70, and includes a NEURON chip 81 corresponding to the processor chip mentioned above. The protocol converter 86 includes a microprocessor 82 that performs translation between data corresponding to an application layer (OSI layer 7) among LONTALK protocol data and data corresponding to an application layer among multi-air conditioner protocol data in communication with the NEURON chip 81.

The NEURON chip 81 is controlled by a separately stored microprocessor interface program 90, and translates data corresponding to the first to sixth OSI layers among the control command data received through the LONWORKS network.

The microprocessor 82 executes a separately stored control application 91, and translates data corresponding to an application layer (OSI layer 7) among the control command data excluding up to the presentation layer portion already processed by the NEURON chip 81 and sends the translated application layer portion to a corresponding network.

Figure 4:
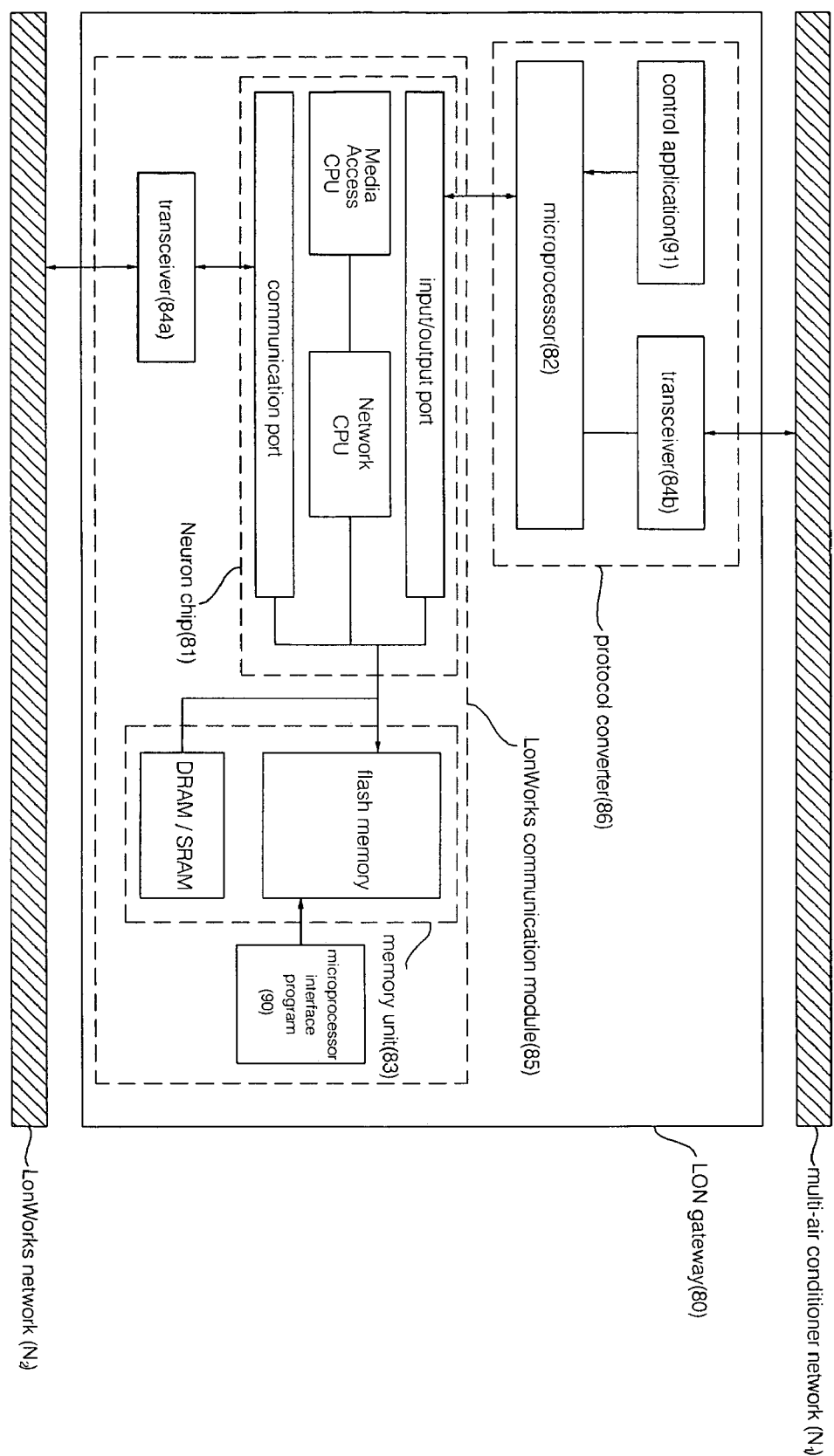
FIG. 4 is a detailed diagram showing the structure of the gateway according to the present invention.

FIG. 4 is a detailed block diagram showing the structure of the Lon gateway according to the present invention.

In the Lon gateway 80 according to the present invention, the LONWORKS communication module 85 includes the NEURON chip 81 for analyzing data received or to be sent through the LONWORKS network $N_2$, a memory unit 83 storing a control program for controlling the NEURON chip 81, and a transceiver 84a which receives data from the LONWORKS network $N_2$ and sends the data to the NEURON chip 81.

The NEURON chip 81 includes hardware and firmware to support easy network application development. The NEURON chip 81 is utilized for a special purpose application and a network interface, and provides input-output capabilities to operate sensors and actuators.

The NEURON chip 81 includes three 8-bit processors and a memory (internal or external) 83 for communication and logic operation. The processors include a LONTALK protocol specification therein. The 8-bit processor for processing application, (OSI layer 7) data is not used for the present invention.

The memory unit 83 can include a flash memory, a static random access memory (SRAM), or a dynamic RAM (DRAM). The memory unit 83 stores the microprocessor interface program 90 for controlling the NEURON chip 81, and can temporarily store data created by the NEURON chip 81.

The Lon gateway 80 includes transceivers 84a and 84b. The transceivers 84a and 84b handle the physical layer (OSI layer 1) to communicate with communication media, and are bus connection modules between the NEURON chip 81 and each one of communication media $N_1$ and $N_2$. In particular, as mentioned above, the transceiver of the LONWORKS system can support various media including twisted pair cables, power lines, link power (low energy power, transmitting DC 24V power and data on the same twisted pair, for example), radio frequency (RF), coaxial cables, optical fibers, and infrared.

The microprocessor 82 of the protocol converter 86 processes 8-bit data. When the control application 91 for controlling the microprocessor 82 is loaded, the microprocessor 82 receives data from the multi-air conditioner network $N_1$ through the transceiver 84b connected with the multi-air conditioner network $N_1$, and translates only an OSI layer seven-related portion of the received data, and sends the translated data to the LONWORKS communication module 85.

The operation of the present invention configured as above is explained as follows.

Figure 5A:
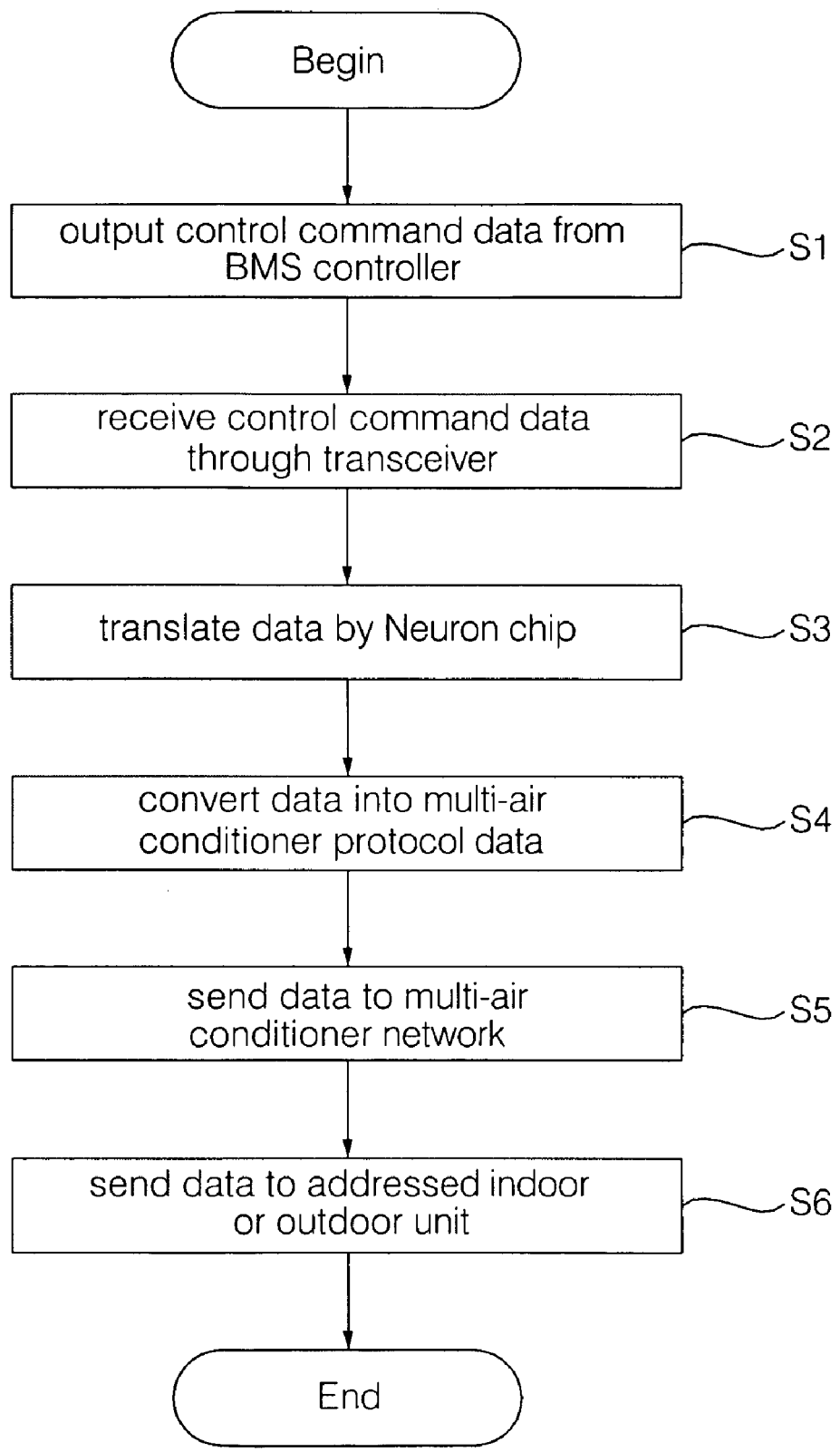
FIGS. 5a and 5b are flow charts illustrating the operation of the building management system according to the present invention.
Figure 5B:
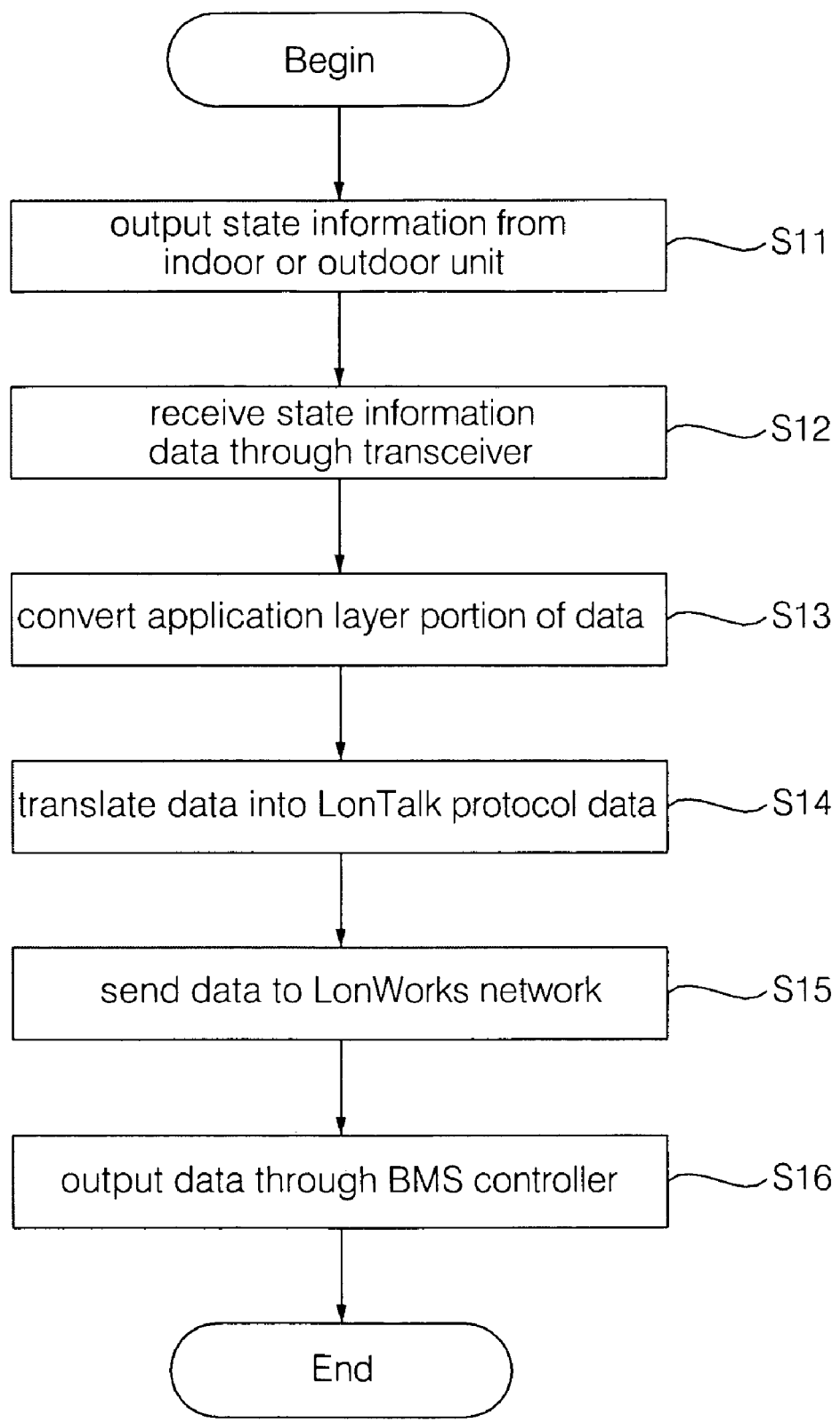

FIGS. 5a and 5b are flow charts illustrating the operation of the building management system according to the present invention. FIG. 5a shows the operation flow when the BMS controller sends a control command to a multi-air conditioner. FIG. 5b shows the operation flow when the multi-air conditioner sends its state information to the BMS controller in response to the control command.

Firstly, if control command data for controlling the multi-air conditioner system 70 is outputted from the BMS controller 50, the outputted control command data is transmitted to the LONWORKS network $N_2$ (S1).

The control command data on the LONWORKS network $N_2$ is inputted to the Lon gateway 80 through the transceiver 84a (S2).

The control command data inputted to the Lon gateway 80 is sent to a LONTALK protocol processing CPU of the NEURON chip 81 through a communication port of the NEURON chip 81. The control command data is analyzed on a layer-by-layer basis up to layer 6 by the CPU (S3).

The analyzed control command data in the LONTALK protocol is sent to the 8-bit microprocessor 82 through a parallel input-output port connected with the CPU. Data corresponding to an application layer (OSI layer 7) among the control command data and is translated into control command data in compliance with the multi-air conditioner protocol (S4). The translated control command data is sent to the multi-air conditioner network $N_1$ through the transceiver 84b connected with the multi-air conditioner network $N_1$ (S5).

The control command data inputted to the multi-air conditioner network $N_1$ is sent to a corresponding indoor or outdoor unit using an air conditioner address embedded in the control command data (S6). The corresponding indoor or outdoor unit performs an operation in response to the received control command data.

Conversely, according to self-setting or the received control command, state information data is outputted from an indoor unit 72 or outdoor unit 71 of the multi-air conditioner system 70 (S11). The outputted state information data is sent to the transceiver 84b of the Lon gateway 80 through the multi-air conditioner network $N_1$ (S12).

Only data corresponding to a physical layer of the OSI layer among the state information data inputted to the transceiver 84b is translated and the translated state information data is sent to the microprocessor 82. The microprocessor 82 translates data corresponding to an application layer (layer 7) among the state information data in the multi-air conditioner protocol under the control of the control application 91, and sends the translated state information data to the NEURON chip 81 (S13).

The state information data in the multi-air conditioner protocol sent to the NEURON chip 81 is translated on a layer-by-layer basis up to a presentation layer by the protocol processing CPU into LONTALK protocol compliant data (S14). The translated state information data is sent to the LONWORKS network N₂ through the transceiver 84a (S15).

The state information data sent to the LONWORKS network N₂ is received by the BMS controller 50 (S16). Consequently, the BMS controller 50 can monitor the state of the multi-air conditioner system 70.

The number of the Lon gateways 80 can be adjusted using the maximum number of the indoor and outdoor units 72 and 71 which can simultaneously send state information data or receive control command data in the multi-air conditioner system 70.

For example, if the maximum number of simultaneous transmissions that the multi-air conditioner system 70 can accommodate is fifty, each Lon gateway 80 can be connected with a group of fifty indoor and outdoor units 72 and 71. If two or more Lon gateways 80 are needed, a unique identification number can be assigned to each one of the Lon gateways 80 through the BMS controller 50. Hence, the BMS controller 50 can separately control each one of the Lon gateways 80.

According to the present invention, the building management system includes the Lon gateway which converts LONTALK protocol data into multi-air conditioner protocol data, and vice versa. The Lon gateway includes the NEURON chip which translates data corresponding to the first to sixth OSI layers among the data, and a microprocessor which further translates the data received from the NEURON chip and sends the translated data to the corresponding network. Consequently, the building management system can incorporate a multi-air conditioner system which utilizes a different communication scheme, without modification. The building management system also facilitates low-cost installation of an integrated control system in the building because each one of the indoor units constituting the multi-air conditioner system can be separately controlled without the need for a communication module to be connected to each indoor unit.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A building management system, comprising:
    a building management system controller connected to a LonWorks network;
    an air-conditioner system connected to a multi air-conditioner network; and
    a LON gateway which bi-directionally converts data of the LonWorks network and the multi air-conditioner network to perform an operation corresponding to a control instruction outputted from a building management system controller and to monitor a state of the multi air-conditioner in the building management system controller, wherein the LON gateway comprises:
    a LonWorks communication module configured to translate data transmitted and received through the LonWorks network; and
    a protocol converter configured to convert LonTalk protocol data transmitted and received through the LonWorks communication module into multi air-conditioner protocol data.

2. The building management system of claim 1, wherein the building management system controller is connected to the LonWorks network to perform centralized control of at least one subsystem within a building.

3. The building management system of claim 1, wherein the air-conditioner system is provided with a plurality of outdoor units and indoor units, the indoor units being connected to the outdoor units.

4. The building management system of claim 1, wherein the air-conditioner system transmits and receives data through an RS-485 communication protocol.

5. The building management system of claim 1, wherein the air-conditioner system is a multi air-conditioner system consisting of a multi air-conditioner in which at least one indoor unit is connected to one outdoor unit.

6. The building management system of claim 1, wherein the LON gateway further comprises a transceiver for a bus connection between a Neuron chip and the LonWorks network.

7. The building management system of claim 1, wherein the LonWorks communication module comprises:
    a Neuron chip configured to analyze the LonTalk protocol data transmitted and received and to translate data up to a presentation layer; and
    a memory that stores a microprocessor interface program, the microprocessor interface program being a control program for operation of the Neuron chip.

8. The building management system of claim 7, wherein the memory is one of a flash RAM, an SRAM, and a DRAM.

9. The building management system of claim 7, wherein the protocol converter comprises a microprocessor configured to convert data corresponding to an application layer of the LonTalk protocol and a multi air-conditioner protocol by transmitting and receiving data to and from the Neuron chip by a control application which controls an operation.

10. The building management system of claim 1, wherein the LON gateway is configured to permit up to 50 indoor units or outdoor units to be connected.

11. The building management system of claim 1, wherein the building management system controller sets a specific number designating the LON gateway to control an operation of the LON gateway.

12. An operation method of a building management system, comprising:
    connecting a building management system controller to a LonWorks network;
    connecting an air-conditioner system to a multi air-conditioner network;
    connecting the LonWorks network to the multi air-conditioner network through a LON gateway;
    outputting a control instruction from the building management system controller through the LonWorks network;
    converting the control instruction from the building management system controller in the LON gateway, wherein the converting the control instruction from the building management system controller in the LON gateway comprises:
    translating the control instruction transmitted and received through the LonWorks network in a LonWorks communication module; and
    converting the control instruction transmitted and received through the LonWorks communication module into multi air-conditioner protocol data in a protocol converter;
    performing an operation in the air-conditioner system corresponding to the control instruction outputted from the building management system controller; and
    monitoring a state of the multi air-conditioner network in the building management system controller.

13. The operation method of claim 12, further comprising performing an operation depending on the control instruction data delivered from the air-conditioner.

14. The operation method of claim 12, wherein converting the control instruction comprises:
    translating the control instruction depending on an OSI layer; and
    converting data corresponding to an application layer into data of the multi air-conditioner protocol.

15. The operation method of claim 12, wherein the control instruction data comprises an address of the air-conditioner.

16. An operation method of a building management system, comprising:
    connecting a building management system controller to a LonWorks network;
    connecting an air-conditioner system to a multi air-conditioner network;
    connecting the LonWorks network to the multi air-conditioner network through a LON gateway;
    outputting state information data from the air-conditioner system connected to the multi air-conditioner network;
    converting state information data of a multi air-conditioner network in the LON gateway into a LonTalk protocol for transmission to the LonWorks network, wherein the converting the state information data of the multi air-conditioner network in the LON gateway comprises:
        converting the state information data transmitted and received through the air-conditioner system in a protocol converter; and
        converting the state information data transmitted and received through the protocol converter into LonTalk protocol data in the LonWorks communication module;
    delivering the converted state information data to the building management system controller; and
    monitoring a state of the multi air-conditioner system in the building management system controller.

17. The operation method of claim 16, further comprising outputting state information data delivered from the building management system controller.

18. The operation method of claim 16, wherein outputting state information data comprises outputting state information from a plurality of outdoor units included in the air-conditioner system or indoor units connected to the outdoor units.

19. The operation method of claim 16, wherein converting state information data comprises:
    reading application layer data of a received state information data; and
    reading and converting the read data through the LonTalk protocol.

* * * * *